United States Patent [19]

Gallagher

[11] 4,229,938
[45] Oct. 28, 1980

[54] ROTARY INTERNAL COMBUSTION ENGINE

[76] Inventor: William A. Gallagher, Box 252, Lincoln, Mont. 59639

[21] Appl. No.: 937,322

[22] Filed: Aug. 28, 1978

[51] Int. Cl.³ .............................................. F02C 5/04
[52] U.S. Cl. .................................................. 60/39.34
[58] Field of Search ............................. 60/39.34, 39.35

[56] References Cited

U.S. PATENT DOCUMENTS

| | | | |
|---|---|---|---|
| 1,021,521 | 3/1912 | Heroult | 60/39.34 |
| 1,287,049 | 12/1918 | Kramer | 60/39.34 |
| 2,481,235 | 9/1949 | Parr et al. | 60/39.34 |
| 3,145,533 | 8/1964 | Ollinger | 60/39.34 |
| 3,200,588 | 8/1965 | Math | 60/39.35 |

*Primary Examiner*—Louis J. Casaregola

*Attorney, Agent, or Firm*—Daniel Jay Tick

[57] ABSTRACT

A drive shaft is coaxially rotatably mounted in a cylindrical engine casing and extends out of the casing. An arm extends radially from the drive shaft in the casing. A combustion chamber is formed in the arm in close proximity with the cylindrical interior surface of the casing and has an end with an exhaust opening therethrough and an ignition opening formed therethrough in the combustion chamber. A spark plug is mounted in the casing and in operative proximity with the opening of the arm. Fuel and air lines extend through the arm to the combustion chamber for supplying fuel and air thereto so that when the spark plug produces a spark in the combustion chamber, the arm rotates the drive shaft.

2 Claims, 2 Drawing Figures

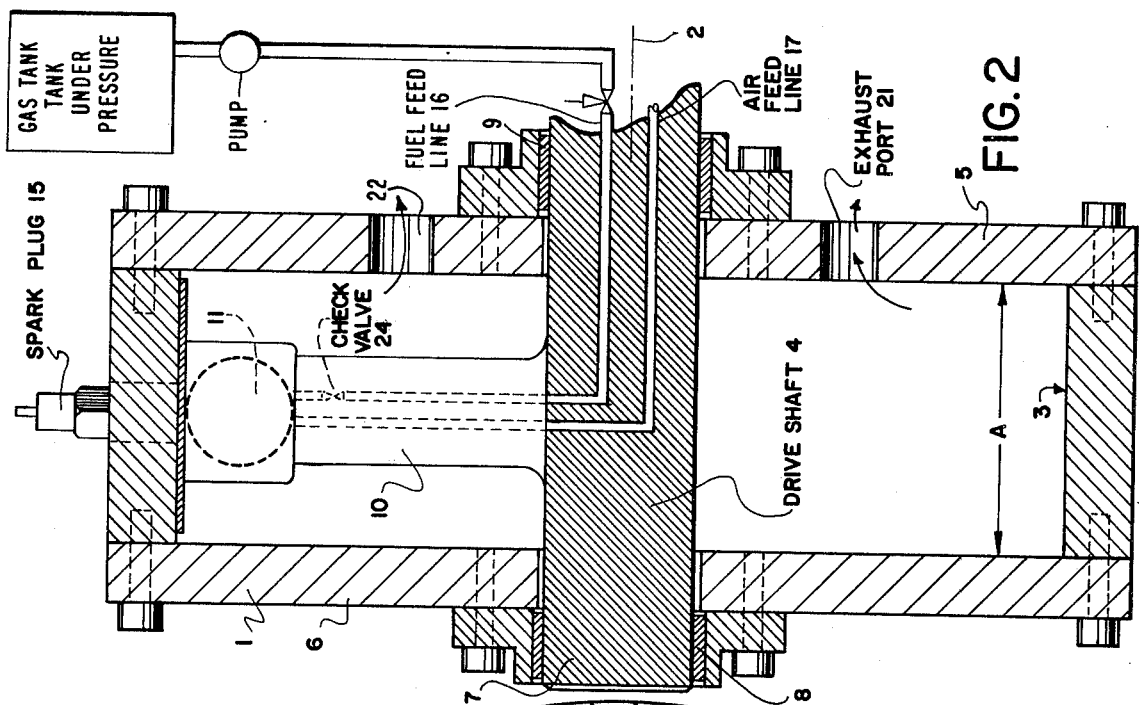
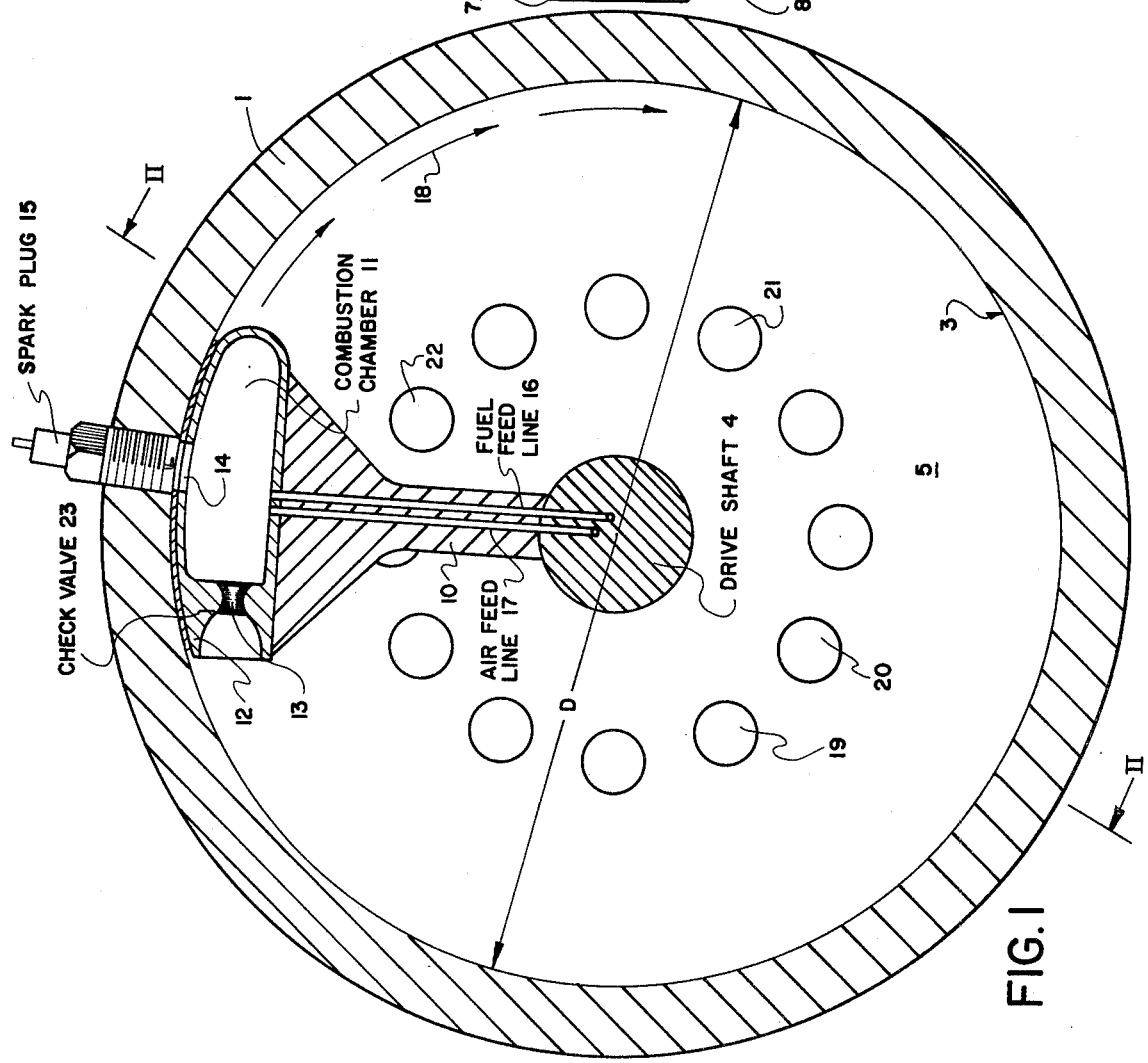

ROTARY INTERNAL COMBUSTION ENGINE

BACKGROUND OF THE INVENTION

The present invention relates to a rotary internal combustion engine.

Rotary internal combustion engines are disclosed in the following United States patents. U.S. Pat. No. 2,995,122, issued Aug. 8, 1961 to Randall, U.S. Pat. No. 3,381,671, issued May 7, 1968 to Duff, U.S. Pat. No. 3,596,641, issued Aug. 3, 1971 to Hofmann, U.S. Pat. No. 3,855,978, issued Dec. 24, 1974 to Becker, U.S. Pat. No. 3,889,645, issued June 17, 1975 to Waters and U.S. Pat. No. 3,994,632, issued Nov. 30, 1976 to Schreiber.

Objects of the invention are to provide a rotary internal combustion engine of simple structure, having very few parts, which are very simple in nature, so that very little, if any, maintenance is required, the engine providing a considerable saving in fuel, a considerable reduction in atomspheric pollution due to a considerably reduced exhaust. and functioning efficiently, effectively and reliably as a rotary engine.

BRIEF DESCRIPTION OF THE DRAWING

In order that the invention may be readily carried into effect, it will now be described with reference to the accompanying drawings, wherein:

FIG. 1 is an axial sectional view of an embodiment of the rotary internal combustion engine of the invention; and FIG. 2 is a sectional view, taken along the lines II—II, of FIG. 1.

DETAILED DESCRIPTION OF THE INVENTION:

The rotary internal combustion engine of the invention comprises a cylindrical engine casing 1 with a predetermined diameter D (FIG. 1), an axis (FIG. 2) and a width A (FIG. 2) smaller than the diameter D. The casing 1 has a cylindrical interior surface 3.

A drive shaft 4 is coaxially rotatably mounted in the engine casing 1 and extends out of said casing beyond both bases 5 and 6 of said casing, as shown in FIG. 2. The end 7 of the drive shaft 4 is mounted in a suitable bearing 8 affixed to the base 6 of the casing 1, as shown in FIG. 2, and the work output extending portion of said shaft is mounted in a suitable bearing 9 affixed to the base 5 of said casing.

An arm 10 extends radially from the drive shaft 4 in the casing 1, as shown in FIGS. 1 and 2. A combustion chamber 11 is formed in the arm at the free end of said arm in close proximity with the cylindrical interior surface 3 of the casing 1, as shown in the FIGS. The combustion chamber 11 has an end 12 with an exhaust opening 13 therethrough, as shown in FIG. 1. The arm 10 has an ignition opening 14 (FIG. 1) formed therethough to the combustion chamber 11.

A spark plug 15 is mounted on the casing 1 and in operative proximity with the ignition opening 14 of the arm 10, as shown in FIG. 1.

A fuel feed line 16 extends through the drive shaft 4 and the arm 10 to the combustion chamber 11 in the arm for supplying fuel to said combustion chamber, as shown in FIGS. 1 and 2.

An air feed line 17 extends through the drive shaft 4 and the arm 10 to the combustion chamber 11 of said arm for supplying air to said combustion chamber. Thus, when the spark plug 15 produces a spark in the combustion chamber 11, the arm 10 rotates in the direction of an arrow 18 of FIG. 1 and rotates the drive shaft 4 in the same direction.

A plurality of exhaust ports 19, 20, 21, 22, and so on, are formed through the base 5 of the casing 1 for passing exhaust gases out of said casing.

A check valve 23 is provided in the exhaust opening 13 of the combustion chamber 11 (FIG. 1). A check valve 24 is provided in the fuel feed line 16, as shown in FIG. 2.

While the invention has been described by means of a specific example and in a specific embodiment, I do not wish to be limited thereto, for obvious modifications will occur to those skilled in the art without departing from the spirit and scope of the invention.

I claim:

1. A rotary internal combustion engine, comprising
   a cylindrical engine casing with a predetermined diameter, an axis and a width smaller than the diameter, the casing having a cylindrical interior surface;
   a drive shaft coaxially rotatably mounted in the engine casing and extending out of said casing;
   an arm extending radially from the drive shaft in said casing;
   a combustion chamber formed in the arm in close proximity with the cylindrical interior surface of said casing and having an end with an exhaust opening therethrough, said arm having an ignition opening formed therethrough to said combustion chamber;
   a spark plug mounted in said casing and in operative proximity with the ignition opening of said arm;
   a fuel feed line extending through said drive shaft and said arm to said combustion chamber therein for supplying fuel to said combustion chamber; and
   an air feed line extending through said drive shaft and said arm to said combustion chamber therein for supplying air to said combustion chamber whereby when the spark plug produces a spark in said combustion chamber said arm rotates and rotates said drive shaft.

2. A rotary internal combustion engine as claimed in claim 1, wherein said engine casing has a pair of spaced parallel end parts perpendicular to said axis, one of said end parts having a plurality of spaced holes formed therethrough for directing exhaust out of said engine casing.

* * * * *